US006829569B1

(12) United States Patent
Drucker et al.

(10) Patent No.: US 6,829,569 B1
(45) Date of Patent: Dec. 7, 2004

(54) SOCIAL DILEMMA SOFTWARE FOR EVALUATING ONLINE INTERACTIVE SOCIETIES

(75) Inventors: Steven M. Drucker, Bellevue, WA (US); Joshua Berman, Atlanta, GA (US); Peter Kollock, Calabasas, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/392,678

(22) Filed: Sep. 9, 1999

Related U.S. Application Data
(60) Provisional application No. 60/100,423, filed on Sep. 15, 1998.

(51) Int. Cl.[7] .............................. G06G 7/48; A63F 13/00
(52) U.S. Cl. ................................................. 703/6; 463/1
(58) Field of Search ................................... 703/6; 463/1

(56) References Cited

U.S. PATENT DOCUMENTS
6,210,272 B1 * 4/2001 Brown .......................... 463/1

OTHER PUBLICATIONS
Honda et al., "Virtual Society: extending the WWW to support a multi–user interactive shared 3D environment"; pp. 109–116; Proc. Virtual reality Modeling Symp.; 1995.*
Saar; "VIRTUS: a collaborative multi–user platform"; pp. 141–152; Virtual reality Modeling Language Symp.; Jan. 1999.*
"Prisoner's Dielemma"; 1995; pp. 1–3; (http://pespmc.vub.ac.be/PRISDIL.html.*
Berman et al.; "The Commons: a toolkit for the quantitative analysis of factors in the success or failure of electronic societies"; pp. 1–7; date unknown.*
Grobelnik et al.; "Strategic interaction on the internet"; Spring 1999; pp. 1–12.*
Noise–IPD Game Contest Rules; Mar. 1996; pp. 1–7; (http://darwin.esys.tsukuba.ac.jp/IPD.ipd–eng.doc.html.*
Kollock, Peter, "Social Dilemmas: The Anatomy of Cooperation," Annual Review of Psychology 1998, 24:183–214.
Rocco, E.. "Trust Breaks Down in Electronic Contexts But Can be Repaired by Some Initial Face–to–Face Contact," Proc. of CHI '98 (Los Angeles, CA Apr. 1998), ACM Press, 496–520.
Axelrod, Robert, *The Evolution of Cooperation*, Basic Books, New York, 1984.

* cited by examiner

*Primary Examiner*—Hugh Jones
(74) *Attorney, Agent, or Firm*—Microsoft Corporation (57) ABSTRACT

Social dilemma virtual world environment (VWE) software facilitates creation and usage of social dilemma tests or exercises for measuring and analyzing online interactive societies. An online interactive society arises whenever two or more people interact through a computer-based communication medium, which may include text or written communication, audio communication, still or motion video communication, or any combination of these communication formats. The social dilemma VWE software and the methodology of the present invention are capable of distinguishing the levels of cooperation and trust that are created by various interface and social factors within online interactive societies. Evaluating with social dilemma VWE software the effects of such social and interface factors on the degree of online cooperation allows such factors to be incorporated into the design and functionality of online interactive societies.

20 Claims, 8 Drawing Sheets

SOCIAL DILEMMA SOFTWARE FOR EVALUATING ONLINE INTERACTIVE SOCIETIES

RELATED APPLICATION

This application claims the benefit of the filing date of U.S. provisional application No. 60/100,423, filed Sep. 15, 1998.

FIELD OF THE INVENTION

The present invention relates to evaluating social aspects of online interactive societies and, in particular, to utilizing an object oriented multi-user domain to provide social dilemma exercises to evaluate interactions between people in online interactive societies.

BACKGROUND AND SUMMARY OF THE INVENTION

An online interactive society arises whenever two or more people interact through a computer-based communication medium, which may include text or written communication, audio communication, still or motion video communication, or any combination of these communication formats. Online interactive societies can include interactions between a customer and a service provider at a commercial or transactional network site, interactions between collaborating workers or professionals, conversational interactions between two or more people, interactions between participants in a game or other recreational activity, etc. Such interactions can occur over a variety of computer connections, including networks such as the Internet, intranets, LANs, WANS, etc.

Online interactive computer systems evolved from prior stand-alone computer systems. The user interface aspects of both types of computer systems have typically focussed on computer system capabilities, user convenience and ease of use, and design aesthetics. These different considerations are often applied to the design of a user interface based upon intuitive conclusions reached by the system designers. While these design considerations may have been adequate for stand-alone computer applications, the social aspect of online interactive computer systems requires additional considerations than those typically applied to stand-alone computer systems.

In an online interactive computer system, the type and format of the interaction or communication between people can be considered a user interface aspect of the system or, more likely, can reach to the core functionality of the system. In view of the importance of the interactive or social aspects of such computer systems, evaluation of the interface and social aspects of online interactive computer systems requires a more quantitative analysis.

One metric social scientists have developed to measure the success of a relationship or group is the level of trust or cooperation between members of the group. Well-defined models and methods have been developed to test the existence and dynamics of cooperation in social relations, including the use of social dilemmas. Social dilemmas are situations in which an individually reasonable decision can result in everyone in the "society" being relatively better or worse off. Models of social dilemmas capture this tension between individually and collectively beneficial outcomes and so can be used to assess the level of cooperation and trust in a group such as an online interactive society.

The present invention provides social dilemma virtual world environment (VWE) software that facilitates creation and usage of social dilemma tests or exercises for measuring and analyzing online interactive societies. A virtual world represents a real or imaginary place using graphics, images, video, force feedback, and audio data to define a representation of the place on a computer for one or more users. Typically, the virtual world enables multiple users to simultaneously perceive and interact with the virtual world and with each other through different computers that are connected by a network.

The social dilemma VWE software and the methodology of the present invention are capable of distinguishing the levels of cooperation and trust that are created by various interface and social factors within online interactive societies. Evaluating with social dilemma VWE software the effects of such social and interface factors on the degree of online cooperation allows such factors to be incorporated into the design and functionality of online interactive societies.

Social factors that can be evaluated with the social dilemma VWE software may include the availability or absence of unstructured communications such as with synchronous text chat, asynchronous text chat (e.g., e-mail), verbal or audio communication, still or motion video communication, historical, social, or other background information about others, etc. Interface factors that can be evaluated with the social dilemma VWE software may include the format, style, or layout of the computer-based interactive environment, including interface colors, fonts, font sizes, the presence or absence of graphical user interface components, terminology for user controls or instructions, etc. Two examples of social dilemmas that can be implemented with the social dilemma VWE software are the classic Prisoner's Dilemma and the continuous Prisoner's Dilemma.

In one implementation a social dilemma virtual world environment has a multi-user virtual social dilemma exercise object (ShowRoom) in which social dilemma exercise component objects (ShowItems) are presented from a server to multiple social dilemma participants at multiple client computers. Each client computer includes interface objects (ShowIets) that communicate with the social dilemma exercise component objects to render corresponding information or exercise features at the participants' client computers (e.g., displays, multimedia information, or other outputs) and to pass to the objects input or communications from the exercise participants.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
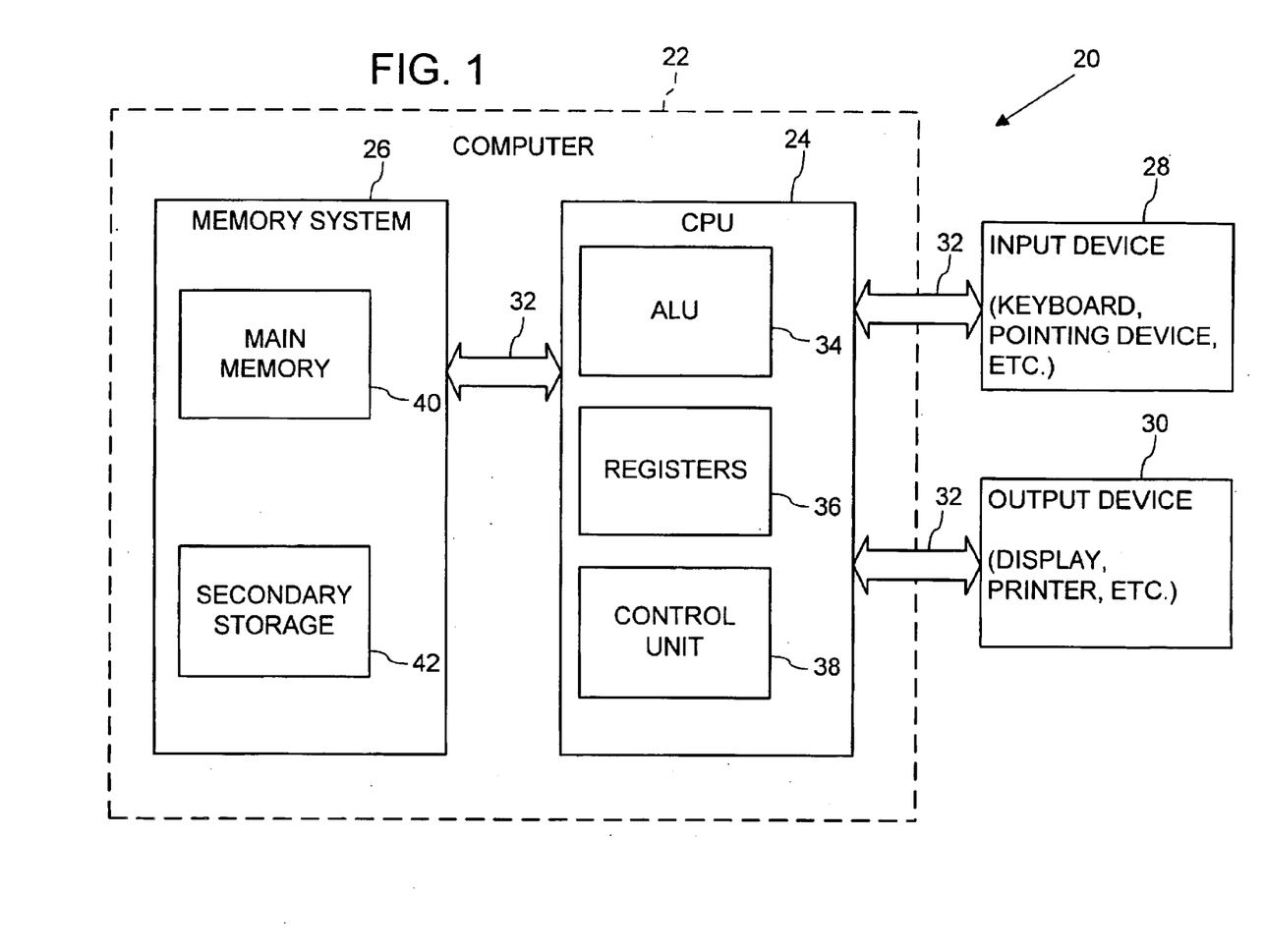
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
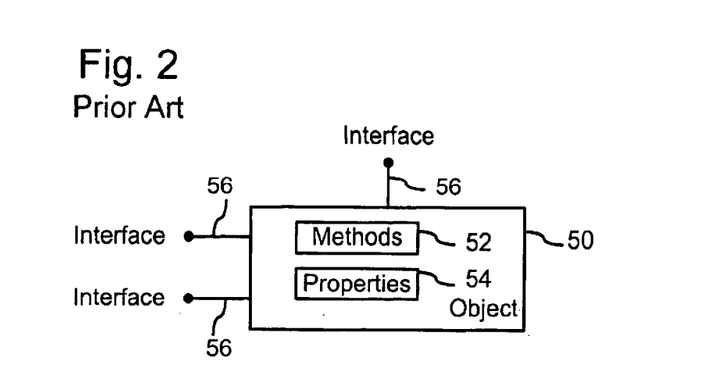
FIG. 2 is a block diagram of a prior art interfaced software object.

FIG. 2 is a block diagram of an exemplary prior art interfaced software object 50 that provides software services such as methods 52 or properties 54 that are accessed by one or more interfaces 56 (multiple shown). A method 52 is typically a function or procedure that performs a specific action and is called via a corresponding interface 56. Properties 54 (also referred to as states or attributes) typically are information or data and are called via a corresponding interface 56. Object 50 is implemented in a server that, for example, may be a dynamic link library utilized by software program or may be an entirely separate executable process.

Each object 50 is an instance of a specific class of related objects. Exemplary object 50 also includes the characteristics of encapsulation, polymorphism, and inheritance. Object 50 encapsulates its properties 54 so each property 54 is accessed only through one of methods 52, thereby protecting the properties (or data) from inappropriate access and errors that can arise therefrom. Object 50 supports polymorphism in that object 50 may present to a software client an interface or a method definition that appears to the client to be the same as an interface or a method definition of another object in a different class. Such interfaces or method definitions of different objects may appear the same to the client of even if the resulting methods have different implementations.

And object 50 also includes interface inheritance in which the definitions of the methods that object 50 supports may be inherited by another object. Interface inheritance simplifies implementation of polymorphism because an object supporting an inherited interface can be treated like the object from which the interface is inherited. Object 50 may be implemented by or in accordance with many object-oriented programming tools or models including, for example, the component object model (COM). COM is a foundation for object oriented technologies such as OLE and ActiveX utilized by Microsoft Corporation and others. By way of example, the following description is made with reference to an object 50 implemented according to COM, but is similarly applicable to other object-oriented programming tools or models of similar characteristics.

Interfaces 56 of object 50 may not be changed once object 50 is established, distributed, or promulgated for general use at run-time. Adding new services to or modifying existing services in such an object 50 requires that a new interface be defined. The new interface may inherit services from an existing interface, but the new interface remains distinct and has a unique identifier. As a result, interfaces 56 are static. While being a limit on the extensibility of objects, static interfaces provide stability and predictability in the use of objects.

Figure 3:
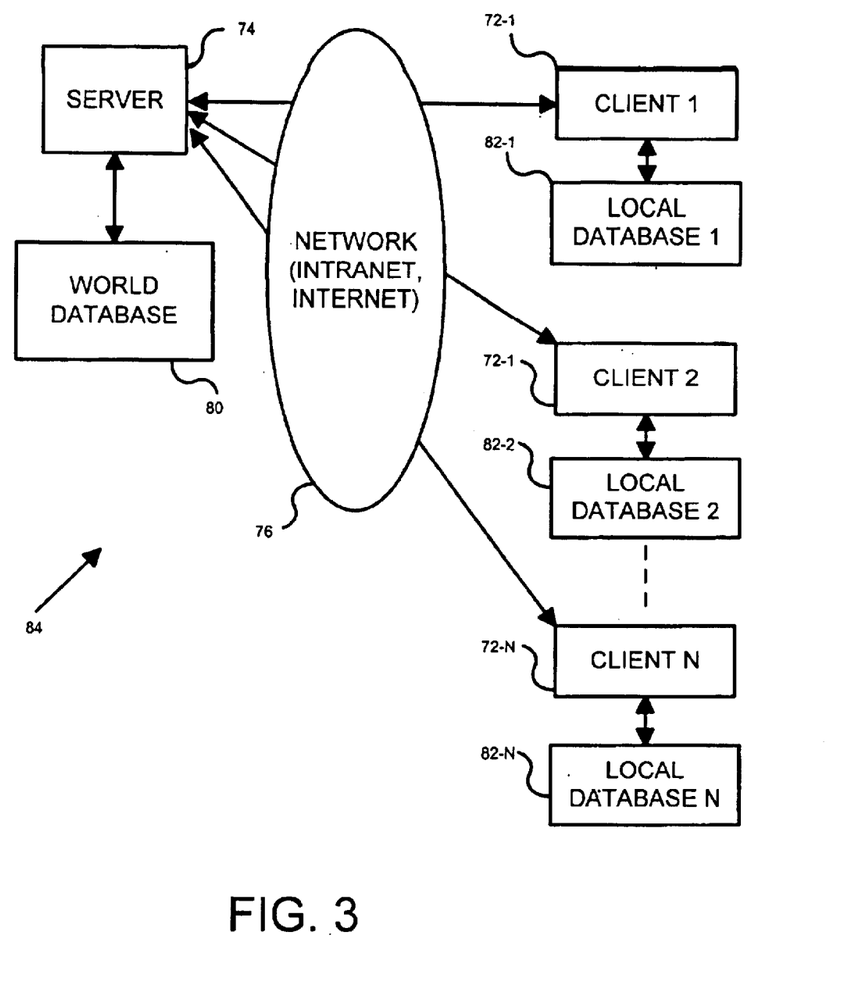
FIG. 3 is an exemplary view of the client-server architecture showing the world database maintained by the server computer and local databases maintained by each of n-number of client computers.

FIG. 3 is a block diagram illustrating a client-server architecture as an operating environment for a distributed object database according to the present invention. Multiple client computers or clients 72 are in communication with a server computer or server 74 via a network 76, such as a LAN, WAN, intranet, or the Internet. Clients 72 and server 74 have, for example, the basic configuration illustrated in FIG. 1, but may include component variations as is known in the art. As a distributed object database, server 74 maintains a central or world object database 80 while clients 72 maintain local object databases 82. World object database 80 and local object databases 82 together form a distributed object database 84. For purposes of illustration, distributed object database 84 will be discussed with reference to a representation of an interactive virtual world environment (VWE) or domain. The VWE represents an environment for conducting social dilemma exercises with multiple, potentially hundreds or thousands of computer users. World object database 84 comprises objects that correspond to particular types of interface or social factors within the environment.

Figure 4:
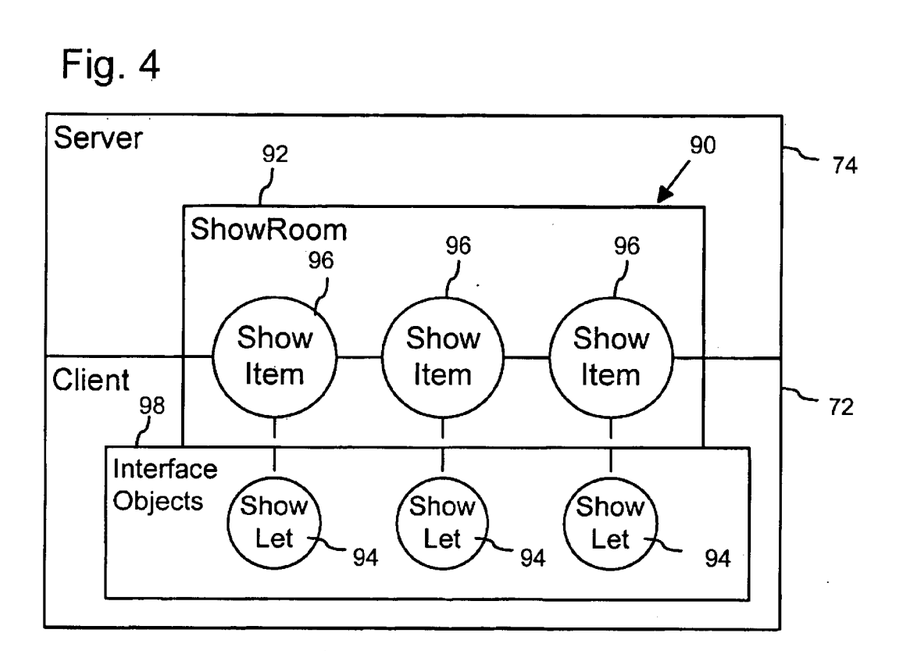
FIG. 4 is a schematic illustration of social dilemma virtual world environment (VWE) computer software to aid in the design and study of online interactive societies.

FIG. 4 is a schematic illustration of social dilemma virtual world environment (VWE) computer software 90 to aid in the design and study of online interactive societies. An online interactive society may arise whenever two or more people interact through a computer-based communication medium, which may include text or written communication, audio communication, still or motion video communication, or any combination of these communication formats. Online interactive societies can include interactions between a customer and a service provider at a commercial or transactional network site, interactions between collaborating workers or professionals, conversational interactions between two or more people, interactions between participants in a game or other recreational activity, etc. Such interactions can occur over a variety of computer connections, including networks such as the Internet, intranets, LANs, WANs, etc. Participants in the interactions may or may not have background or historical information about each other.

In one implementation, social dilemma VWE software 90 facilitates creation and usage of social dilemma tests or exercises for measuring and analyzing online interactive societies. Social dilemmas are situations in which an individually reasonable decision can result in everyone in the "society" being relatively better or worse off. Models of social dilemmas capture this tension between individually and collectively beneficial outcomes and so can be used to assess the level of cooperation and trust in a group such as an online interactive society. Social dilemma VWE software 90 and the methodology of the present invention are capable of distinguishing the levels of cooperation and trust that are created by various interface and social factors within online interactive societies. Evaluating with social dilemma VWE software 90 the effects of such social and interface factors on the degree of online cooperation allows such factors to be incorporated into the design and functionality of online interactive societies.

Social factors may include the availability or absence of unstructured communications such as with synchronous text chat, asynchronous text chat (e.g., e-mail), verbal or audio communication, still or motion video communication, historical, social, or other background information about others, etc. Interface factors may include the format, style, or layout of the computer-based interactive environment, including interface colors, fonts, font sizes, the presence or absence of graphical user interface components, terminology for user controls or instructions, etc.

Two examples of social dilemmas that can be implemented with social dilemma VWE software 90 are the classic Prisoner's Dilemma and the continuous Prisoner's Dilemma. Other examples social dilemmas that can be implemented with social dilemma VWE software 90 include common pool resource games, assurance games, and chicken games. In the Prisoner's Dilemma exercises or games, two or more participants play directly against each other in multiple rounds or iterations that together are sometimes referred to as an iterated Prisoner's Dilemma exercise. The following description is made primarily with reference to exercises in which two participants play against each other, but is similarly applicable to exercises in which more than two participants in direct play against each other.

In each round of the Prisoner's Dilemma exercises, each participant is given a choice between cooperating with or defecting against the other participant. At the start of each round, the participants are assigned points: one point each in the classic game and multiple points each in the continuous game. Each participant then independently chooses whether to contribute all or some of points to the other participant. In the classic game, each participant cooperates or defects completely by contributing or retaining his one point. In the continuous game, each participant may contribute or retain any number of his points, thereby allowing degrees of cooperation that better model the degrees of cooperation characteristic of real-world social interactions. Points that are contributed to another participant are multiplied (e.g., doubled), and retained points keep their original value. Each participant's goal is to obtain the greatest number of points.

In an exemplary dyadic (i.e., two-participant) implementation of the continuous Prisoner's Dilemma, each of first and second participants may be presented with the following rules:

At the beginning of each round, you will be given 10 points. During each round you will be asked to decide how many of the 10 points you want to give to the person you are interacting with. The amount you give away will be DOUBLED and given to the other person, However, YOU DO NOT RECEIVE ANY RETURN FROM THE POINTS YOU GIVE OUT. The person you are interacting with is asked to make exactly the same decision. If s/he contributes some points, they will be doubled and you will receive them.

Accordingly, each participant is assigned 10 points at the start of each round. Each participant may retain all 10 of his points or choose to contribute any number of his points to the other participant. In this implementation, the greatest possible return for one participant (e.g., the first participant) would come from that participant totally defecting against the other (i.e., retaining all 10 points) while the other participant completely cooperates (i.e., contributing all 10 points). With the doubling of the contributed points (i.e., to a value of 20), the first participant would achieve a total of 30 points and the second participant would achieve zero points. In contrast, the greatest possible simultaneous return for both participants would come from each of them completely cooperating (i.e., contributing all 10 points), which would be doubled to give each participant a total of 20.

In a client-server arrangement of the type illustrated in FIG. 3, for example, social dilemma VWE software 90 supports at a server 74 a social dilemma VWE having a social dilemma exercise (or "ShowRoom") object 92 for controlling a social dilemma exercise. For purposes of explanation, each social dilemma exercise refers to the typically multiple rounds between two or more participants who are in direct play with each other. The social dilemma VWE can provide an environment for measuring and analyzing an online interactive society by supporting simultaneously multiple (e.g., up to hundreds or thousands) social dilemma exercise (or ShowRoom) objects 92 that each represents a separate social dilemma exercise. The multiple simultaneous social dilemma exercises may or may not all include the same social and interface factors.

Each of the participants in the social dilemma exercises is located at and operates a client computer 72 in communication with the server 74, which may be implemented by one or more server computers. Software 90 further includes at each client 72 one or more social dilemma client interface or Showlet objects 94 that provide one or more interface elements to the social dilemma exercise. The interface elements provided by the client interface or Showlet objects 94 may be separately associated with implementing the social dilemma exercise and implementing the social interaction variables (e.g., types of participant communication, contextual information about other participants, etc.) used to measure or analyze the social interactions.

Figure 5:
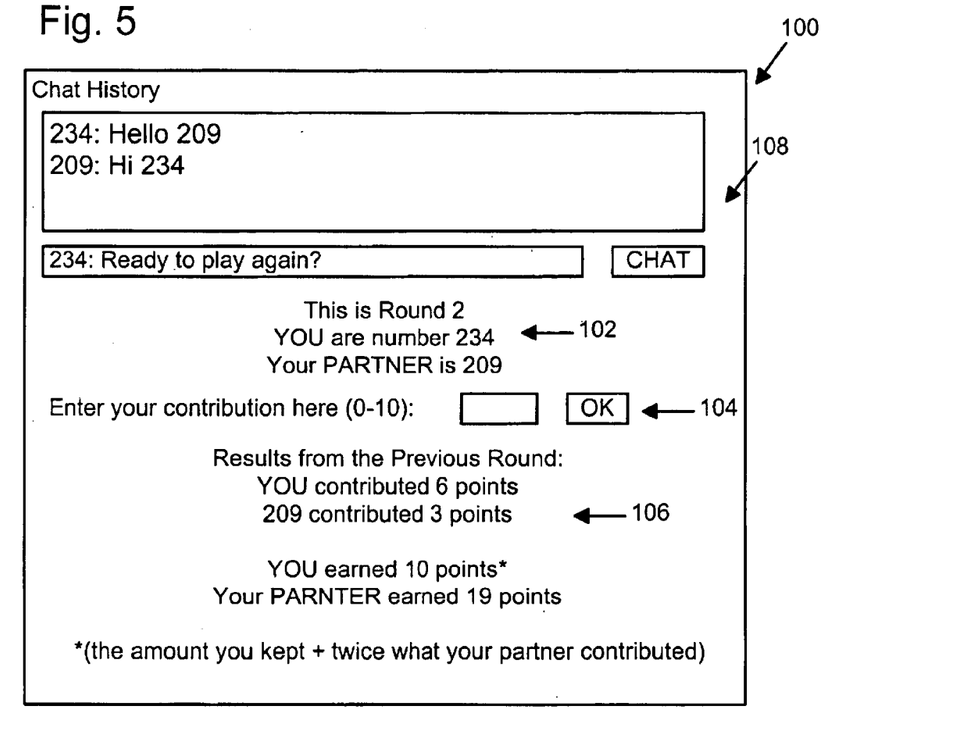
FIG. 5 is an illustration of a participant interface rendered on a display screen associated with a participant client computer in connection with a social dilemma exercise.

FIG. 5 is an illustration of a participant interface 100 rendered on a display screen associated with a participant client 72. This illustration is based upon a version of the continuous Prisoner's Dilemma in which the participants' selective contributions of 0–10 points are doubled. Accordingly, participant interface 100 includes a social dilemma exercise interface component 102 that renders participant identifying information, a social dilemma exercise interface component 104 by which the participant enters a contribution selection, and a social dilemma exercise interface component 106 that renders the results of an immediately preceding round of the exercise.

It will be appreciated that interface components 102–106 could be incorporated into and provided by a single client interface or Showlet object 94 or, alternatively, each of interface components 102–106 could be incorporated into and provided by a separate client interface or Showlet object 94. It will also be appreciated that fewer than all of interface components 102–106 could be employed and that additional interface components or entirely different interface components could be employed.

Participant interface 100 further includes a social interaction interface 108 illustrated as a synchronous text chat interface by which participants in a social dilemma exercise may voluntarily have discussions with each other. The subject matter and timing of the discussions are not restricted. In alternative implementations, social interaction interface 108 could provide the participants, either separately or additionally, audio interaction, still or motion video interaction, historical information about the other participant's previous interactions, social or personal information about the other participant, etc. Social interaction interface 108 could be incorporated into and provided by a single client interface or Showlet object 94 with interface components 102–106 or, alternatively, could be incorporated into and provided by a client interface or Showlet object 94 separate from the objects 94 for each of interface components 102–106.

The one or more client interface or Showlet objects 94 at the clients 72 of participants in a social dilemma exercise correspond to exercise component (or ShowItem) objects 96 that are associated with social dilemma exercise (or "ShowRoom") object 92. Client interface objects 94 are included within an interface object space 98 that cooperates with, but is distinct from, social dilemma exercise object 92. For each client interface object 94 there is an exercise component object 96 (indicated by dashed lines), and the pair have mutual object references that tie them together.

Social dilemma exercise (or "ShowRoom") object 92 and exercise component objects 96 are global objects in that they are provided from server 74 to client computers 72 as part of the social dilemma VWE. Exercise component (ShowItem) objects 96 are replicated across server 74 and the clients 72 of all participants and provide a model representing a social dilemma exercise in the social dilemma VWE. Client interface objects 94 exist on each client 72 and provide a view of the social dilemma VWE, with user interface and control elements, which view is separate from the model provided by exercise component objects 96. Separating the model represented by objects 96 from the user interface and controls provided by objects 94 provides a multi-user object oriented user domain such as a social dilemma VWE that can be rendered easily and efficiently while also allowing information to be obtained from the multiple users. Moreover, client interface objects 94 are a compact and versatile manner of distributing and implementing user interface and control functionality.

In one implementation, one Showlet client interface object 94 corresponds to each ShowItem exercise component object 96 in a social dilemma exercise (or "ShowRoom") object 92 representing a social dilemma exercise, thereby providing a one-to-one relationship between the respective view and model objects. The separation of the model and the view provides encapsulation of the interface implementation separate from the exercise (i.e., functional) implementation and from other interface objects. This allows independent development of different interface items. It also allows different interfaces to be attached to the same exercise at different times or for different users (e.g., "participant" versus "administrator"). And it allows different technologies to be used for functional and representational items (e.g., scripting or C++ for function, and DHTML for representation). It will be appreciated that in other implementations a one-to-plural relationship could exist between a ShowItem exercise component server object 96 and plural Showlet client interface objects 94 to provide different visualizations of a presentation element, or a plural-to-one relationship could provide a unified view of different presentation elements.

Social dilemma exercise object 92 and exercise component objects 96 are provided by or from one or more exercise administrators who may also be at one or more client computers 72, who construct a social dilemma VWE to evaluate or analyze social interactions based upon selected social and interface factors as described above. These administrators may be sociologists, behavior scientists, marketers, or others seeking to understand the how different social and interface factors can increase or decrease cooperation in an online society. The analytical results provided by the social dilemma VWE contrast with the intuitive analyses more commonly applied to interface and social factor design considerations.

The effects on social cooperation provided by particular social and interface factors incorporated into social dilemma exercises according to this invention may be incorporated into other online interactive applications, such as commercial or transactional network sites, collaboration software enabling workers or professionals to collaborate with each other, computer-based communication applications such as text, audio, or video chat applications, interactive games or other recreational activity, etc.

With reference to FIG. 3, world database 80 maintains a complete and centralized representation of social dilemma exercise object 92 and exercise component server objects 96 within the social dilemma VWE. A first client 72-1 of a first participant maintains a first local database 82-1, which includes a subset of the information contained in world database 80. First local database 82-1 need only contain those objects that may potentially affect objects associated with first client 72-1. A second client 72-2 maintains a second local database 82-2 that contains information about objects that may potentially affect objects associated with that client, and thus may be different in its information content than first local database 72-1. As an illustration of an exercise with more than two participants, server 74 is shown coupled to an N-th client 72-N having an N-th local database 82-N, to indicate that an indeterminate number of other clients can be coupled to server 74 for interaction in the social dilemma VWE.

Portions of world database 84 maintained on server computer 74 are downloaded to each of multiple individual client computers 72 and are included in each of multiple corresponding local databases 82. Objects in the local databases 82 are rendered by an application on a display associated with the corresponding client 72. The user may view and manipulate the objects, e.g., communicating with or contributing points to other participants. Manipulation of or changes to objects in the local databases 82 are communicated to the world database 84 maintained on the server computer 74. Updates to the world database 84 due to changes at the client computers 72 are handled automatically and dynamically by server computer 74.

Each exercise involving direct participants occurs in association with a social dilemma exercise object 92, which allows server 74 to limit the list of clients 72 that need updating for that exercise. Each client 72 associated with the social dilemma exercise object 92 maintains a local database 82 that includes a subset of the information contained in world database 80. Each local database 82 need only contain those global objects that may potentially affect objects associated with that client 72. With regard to the direct participants in a social dilemma exercise, the same portions of world database 84 will typically be downloaded to each participant client computer 72.

Client interface objects 94 convey information (e.g., render a display) at each viewer client computer 72 according to the methods and properties of the social dilemma exercise object 92 and exercise component objects 96 in the local database 82. In addition, client interface objects 94 allow a viewer to manipulate social dilemma exercise object 92 and exercise component objects 96 in the local database 82 to pass information from the participant to server computer 74.

In the illustrated continuous Prisoner's Dilemma, for example, a participant can indicate a contribution to be made to another participant or may communicate (e.g., synchronous text chat) with another participant through one or more client interface objects 94. The one or more client interface objects 94 on the participant's client computer 72 pass the selected contribution for another participant or the communication to the social dilemma exercise object 92 or an exercise component object 96 on the client computer 72, and server computer 74 updates world database 80 accordingly. With regard to a selected contribution, for example, server computer 74 typically accumulates contributions from all participants before distributing to the participants corresponding modifications to objects 92 or 96. With regard to a communication, for example, server computer 74 can distribute corresponding modified objects 92 or 94 substantially immediately or at predetermined times.

Figure 6:
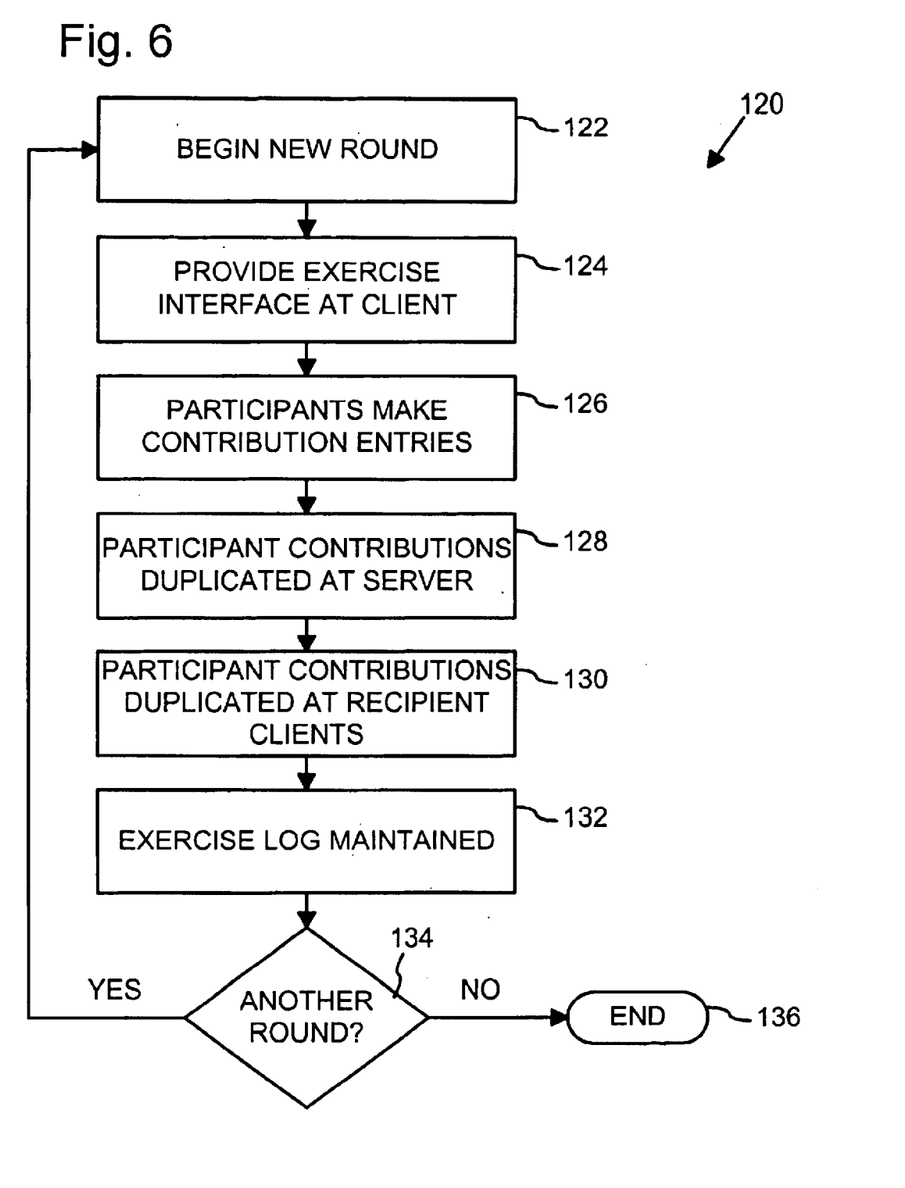
FIG. 6 is a flow diagram of a social dilemma exercise method illustrating an exemplary continuous Prisoners Dilemma exercise.

FIG. 6 is a flow diagram of a social dilemma exercise method 120 illustrating, for example, the continuous Prisoner's Dilemma exercise between two participants in direct play with each other. Social dilemma exercise method 120 implements a social dilemma exercise designed by an exercise administrator studying the effects of particular interface and social variables. Social dilemma exercise method 120 allows evaluation and analysis of interface and social variables in social dilemma exercises to improve the design and social effectiveness of online interactive applications, such as commercial internet or web sites.

Process block 122 indicates the beginning of a new round in the social dilemma exercise.

Process block 124 indicates that a social dilemma exercise interface (e.g., participant interface 100 shown in FIG. 5) is provided at a client computer 72 of each participant. The social dilemma exercise interface is based upon client interface objects 94 and associated exercise component (or ShowItem) objects 96 and includes social dilemma exercise components and may also include participant communication components.

Process block 126 indicates that each participant makes a social dilemma exercise entry at his or her computer 72. In the exemplary continuous Prisoner's Dilemma exercise, each participant enters a value of between 0 and 10 to be contributed to the other participant. The entry made by the participant is incorporated into the corresponding exercise component object 96 residing at the client computer 72.

Process block 128 indicates that the participant contribution entries incorporated into the exercise component objects 96 residing at the client computers 72 are duplicated in the exercise component objects 96 at the server 74.

Process block 130 indicates that the respective participants' contribution entries in the exercise component objects 96 at the server 74 are duplicated at the exercise component objects 96 residing at the client computers 72 to which the contributions are directed. Typically, the participant contribution entries are duplicated at the exercise component objects 96 residing at the client computers 72 only after all the participant contribution entries for a round of the exercise have been received at server 74.

Process block 132 indicates that a log is maintained in a log file stored in memory at server 74 indicating the social and interface factors associated with the exercise, all participant contributions and, optionally, all communications between participants. The log is available to and reviewed by the administrator of the social dilemma exercise to determine the level of cooperation between the participants and, hence, the effectiveness of the particular social and interface factors utilized in the exercise. The log may be accessed by the administrator during or after the exercise either at the server 74 or, more commonly, from a client 72 with access to server 74.

Query block 134 represents in inquiry as to whether another round is to be played between the participants. The number of rounds is one of the exercise variables selected by the administrator. Whenever another round is to be played, query block 134 returns to process block 122. Whenever another round is not to be played, query block 134 proceeds to termination block 136.

Figure 7:
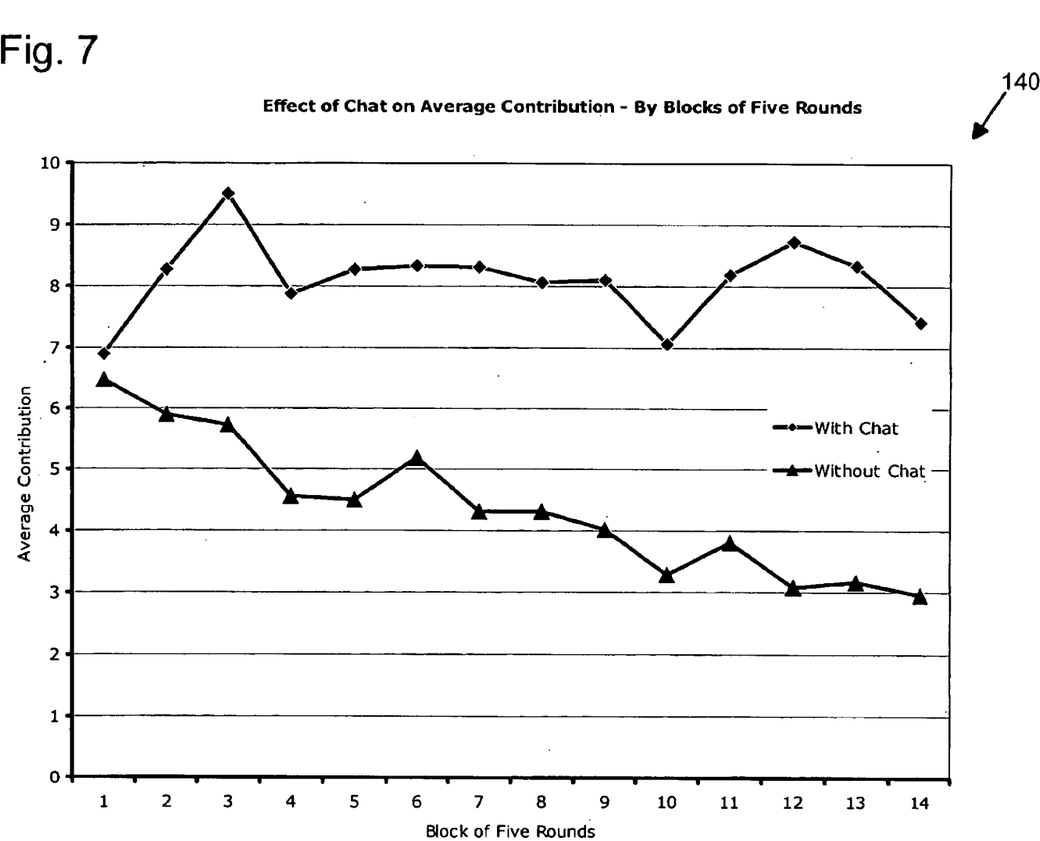
FIG. 7 is a graph illustrating analytical results of social dilemma exercises measuring the levels of social cooperation in the presence or absence of synchronous text chat in the exercises.

FIG. 7 is a graph 140 illustrating analytical results of a small number (20) of dyadic continuous Prisoner's Dilemma exercises measuring the levels of social cooperation in the presence or absence of synchronous text chat in the exercises. The 20 pairs of participants were randomly divided into two groups. In a first group, the pairs of participants played over 70 rounds of the continuous Prisoner's Dilemma exercise and could also communicate with each other with synchronous text chat, as illustrated in FIG. 5. In a second group, the pairs of participants played the continuous Prisoner's Dilemma exercise, but could not otherwise communicate with each other.

Graph 140 shows the average contributions to other participants in blocks of five rounds for the first (chat) and second (no chat) groups. Although the average contributions of both groups are initially relatively close (i.e., both between 6 and 7), the averages soon diverged such that the first (chat) group maintained an average contribution of about 8 and the second (no chat) group had generally declining levels of contribution to about 4. This simplified example illustrates the relative effectiveness of synchronous text chat over no chat for maintaining cooperation in an online interactive society. It will be appreciated, however, that larger-scale and more detailed analyses could be conducted to determine relative effectiveness of interface factors and other types of computer-based communication to determine, for example, whether additional costs to provide more complex communication are effective expenditures.

An implementation of the present invention provides that object services like methods or properties are provided to or inherited by objects dynamically during run-time. This dynamic inheritance may be provided within the context of an object model, such as the Component Object Model, that supports only design-time inheritance. As applied in a virtual world environment, for example, dynamic inheritance can provide exercise administrators with increased levels of interaction or control.

In a method of providing dynamic inheritance, hierarchical relationships are defined between multiple objects such that each object references or is referenced by another object. One of the objects is a root object that is referenced by at least one other object but that does not reference another object. A call is made for a particular service (e.g., a method or property) at a selected object. The service is provided directly from the object whenever the service is available therefrom.

Whenever the selected service is unavailable at the selected object, the call is passed to a referenced object (i.e., an object that is referenced by the selected object). The service is provided directly from the referenced object whenever the service is available therefrom or the call is passed to yet another referenced object until the service can be provided. The call may be passed to multiple successive referenced objects until the call reaches the root object, which either provides the service or the service is deemed unavailable.

Figure 8:
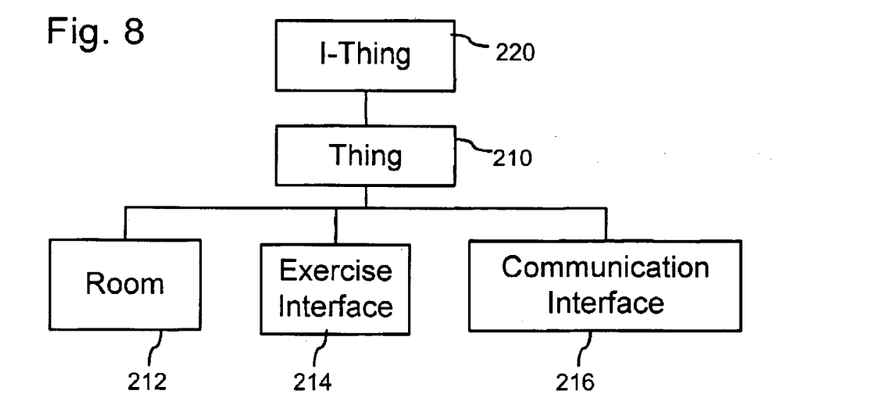
FIG. 8 is a block diagram representing hierarchical inheritance relationships between an exemplary set of objects.

FIG. 8 is a block diagram illustrating hierarchical inheritance relationships between an exemplary set of objects 210–216 for implementing social dilemma exercise (or"ShowRoom") object 92 and exercise interface components 102–106 and social interaction interface 108 (FIG. 5). Objects 210–216 represent abstractions that include data and the operations associated with that data. Exercise interface components 102–106 and social interaction interface 108 are represented by instances of objects 210–216 of an interactive virtual world environment and correspond to particular types of social dilemma exercise components within the environment. Objects 210–214 are based upon an interface 220 (designated I-Thing) that in one implementation is a COM object interface. It will be appreciated, however, that I-Thing interface 220 could alternatively be implemented according to other object models.

Objects 210–214 are the basic objects or types from which other objects inherit services and are called the exemplars for the virtual world environment or representation. Object 210 (designated Thing) is the root or core of the set of all interfaces in the representation. Object 212 (designated Room) represents and defines the social dilemma exercise being implemented. Object 214 (designated Exercise Interface) represents and defines exercise interface features that may be varied to evaluate effects on cooperation between participants. Object 216 (designated Communication Interface) represents and defines communication interface features that may be varied to evaluate effects on cooperation between participants.

Figure 9:
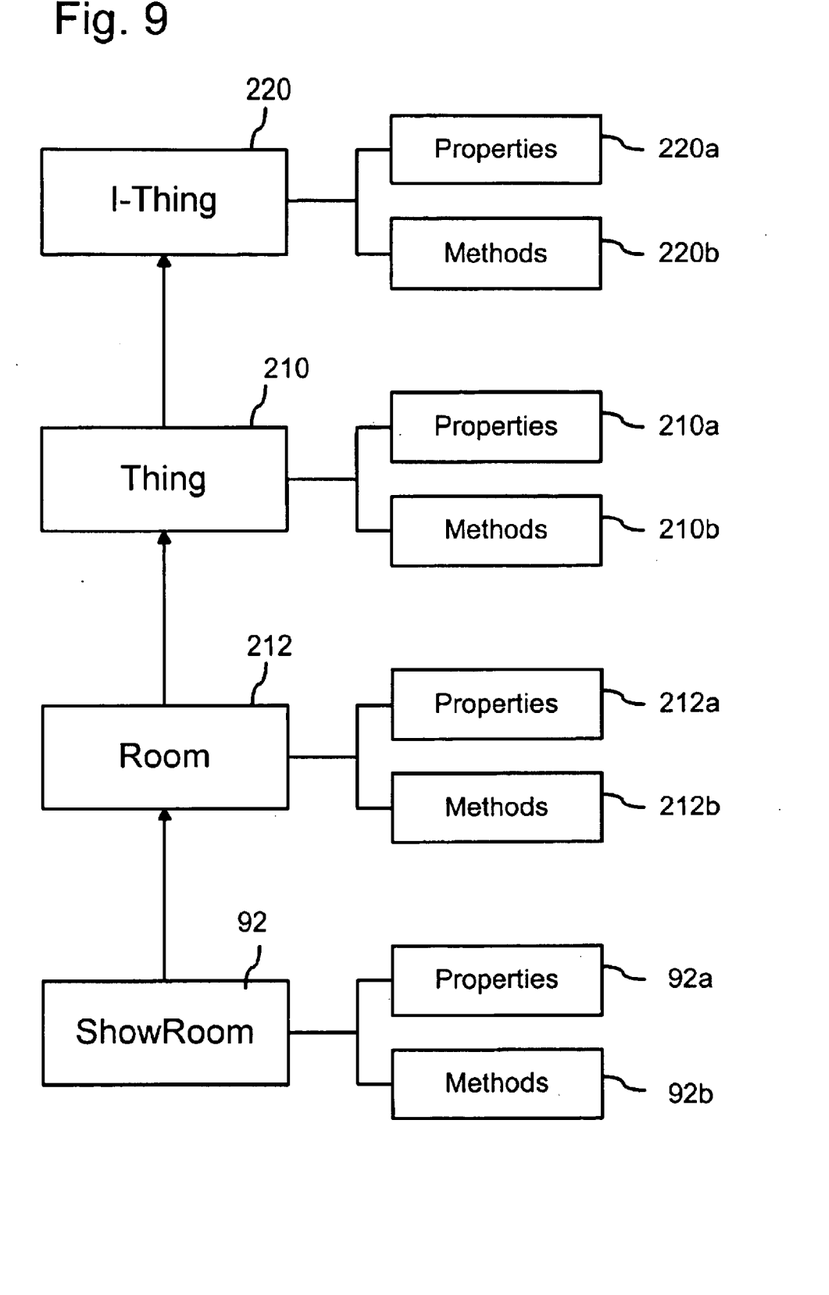
FIG. 9 is a block diagram illustrating a sequence of hierarchical inheritance relationships.

FIG. 9 is block diagram illustrating a sequence of hierarchical inheritance relationships between Thing object 210, exemplar Room object 212, and social dilemma exercise (or "ShowRoom") object 92. Objects 210, 212 and 92 include the characteristics described with reference to objects 56 of object 50 which characteristics are represented as properties 210a, 212a, and 92a and methods 210b, 212b, and 92b, respectively.

Thing object 210 is the root or parent exemplar of the set of objects and is the direct exemplar to Room object 212. Room object 212 is the direct exemplar to ShowRoom object 92, which represents a particular exercise in the virtual world environment.

Thing object 210 defines properties 210a and methods 210b shared by all other objects in the representation or virtual world environment, including exemplars 212 and 92. Properties 210a include for a particular object an exemplar property that refers to the exemplar or parent of the particular object, a name property that lists the name of the particular object, and a description property that includes a text description of the particular object.

Properties and methods are associated with object interfaces during a design time phase when a developer creates them. The interfaces of objects defined under the component object model, for example, cannot be modified after the interfaces have been established, distributed, or promulgated. New functionality or other modifications typically are applied by adding a new interface at a design time phase. Interfaces are fixed or static during a run-time phase when the interfaces are used by or executed on behalf of a user.

ShowRoom object 92 is an exemplar for ShowRoom instances and inherits properties 154a and methods 154b from Room object 154. ShowRoom object 92 contains a social dilemma exercise that can be an active, running exercise, one under construction, one ready to run or be copied, or one that has already been completed. The contents of a ShowRoom object 92 are the ShowItem objects 96 used in the exercise. ShowItem objects 96 can be used as present or potential exercise elements. ShowRoom object 92 includes the following properties 92a and methods 92b.

A ShowElements property lists the past and future ShowItem objects 96 of the social dilemma exercise. The listing may be in the form of an IPropertyList that is a property inherited from Thing object 150. The IPropertyList is an ordered list of values (i.e., properties). A CurrentTopShowItem property contains the currently displayed ShowItem object 96. With the exercise displayed as multiple levels of a network site or page (e.g., an Internet or intranet page), the CurrentTopShowItem property contains the currently displayed ShowItem object 96 for a top level of the page. A CurrentElement property is an index into ShowElements of the last ShowItem displayed.

A CurrentRoleMap property lists the current role that a system user is filling in this exercise. The map key is the user's name or other identifier, and the value is the current role for that user. Roles may include "administrator" and "participant", and may include other roles for other applications. If there is no entry for a user in the map, the "participant" role is assumed. The listing may be in the form of an IPropertyMap that is a property inherited from Thing object 150. The IPropertyMap is an unordered list of name-value pairs in which for a given name or "key" the corresponding object or value is returned.

An AuthorizedPresenters property lists the names of users that can assume the role of administrator. The listing may be in the form of an IPropertyList. A createAndAddShowItem (showItemType) method of ShowRoom object 92 creates and adds a new ShowItem instance. A ShowItemType parameter is the type of ShowItem to create (i.e., the ShowItem sub-exemplar type). Examples of ShowItem types include Meter (a sliding meter that allows participants to select a rating by moving a graphical slider), Chooser (a text question with a list of radio buttons and text answers for the participants to select from), QuestionQueue (a list of participant-generated questions), etc."

A CloneShowItem(showItem) method makes a copy of a ShowItem object 96 and moves it into this ShowRoom. A CloneShowRoom(showRoom) method makes a copy of an entire ShowRoom object 92. This includes calling a Clone-ShowItem method for each of the ShowItem objects 96 in the contents of original ShowRoom object 92. An InsertShowItemAt(showElementsIndex) method inserts a ShowItem object 96 in as exercise ShowItems list at the index specified. A NextElement( ) method increments a CurrentItem property, but not past the end of the list. If the next element is a top-level element (i.e., it replaces the entire page, as described below), the CurrentTopShowItem property is set to the new ShowItem object 96.

ShowItem object 96 is an exemplar for ShowItem instances, which are elements of a social dilemma exercise. A ShowItem can be an entire new page (template), or an element within a page. Each feedback element, such as a question and answer form to be completed by a participant, has a single ShowItem. Each exercise element also has a single ShowItem. For example, exercise elements may be an object or system for broadcasting live or on-demand audio, video, or multimedia components. An example of a format for such objects or systems is NetShow, a platform for streaming multimedia over networks available from Microsoft Corporation. ShowItems also can record the history of the exercise. For example, ShowItems can be used to replay the events in an exercise, to study the participant responses to the exercise, and to provide log information for external processing.

Showlet interface objects 94 are compatible with and rendered by a graphics and multimedia-capable application such as a network browser (e.g., Internet Explorer from Microsoft Corporation) to display information to viewers and accept input from them. Showlet interface objects 94 may be written in any of a variety of languages including JAVA, Dynamic HTML (DHTML), Visual Basic, etc. For purposes of illustration, the following description is made with reference to Showlet interface objects 94 written in Dynamic HTML, but may be similarly applied to other programming or scripting languages.

Dynamic HTML is an extension of standard HTML introduced by Microsoft Corporation and specified in the Internet Client Software Development Kit (SDK) published by Microsoft Corporation. DHTML enables authors to dynamically change the rendering and content of a document by modifying the current document and automatically reformatting and redisplaying the document to show changes. It does not need to reload the document or load a new document, or require a distant server to generate new content. The HTML elements, attributes, and styles in DHTML are based on standard HTML and cascading style sheet CSS) specifications.

Dynamic HTML includes an object model for providing interfaces that allow scripts and components to access DHTML features. Using the object model, HTML elements in a document are available as individual objects, and the elements and their attributes can be examined and modified by reading and setting properties and by calling methods. The object model also makes user actions, such as pressing a key and clicking the mouse, available as events.

Each exercise element (ShowItem) object 96 represents a different functional piece of a social dilemma exercise, although an exercise object 92 might include several exercise components. Within the context of Showlet interface objects 94, ShowItem objects 96 include the following properties and methods. A ShowletID property of each ShowItem object 96 is a DHTML identifier that indicates where to display in a DHTML page (i.e., for a participant) the Showlet interface object 94 corresponding to the ShowItem object 96. The ShowletID property for each interface object 94 on a DHTML page is unique, even if several Showlet objects are nested hierarchically on the page.

A ShowletMap property of each ShowItem object 96 includes a key of a role (e.g., participant or administrator) and a value of the name or other identifier of the Showlet interface object 94 to be used for users filling that role. The ShowletMap property maps from a role to a Showlet name. Each Showlet interface object 94 has a unique Uniform Resource Locator (URL) for locating and accessing the object. The URL of the Showlet interface object 94 is found by looking up its name in a ShowletURLMap property, which maps from the Showlet name to its URL. A Showlets property lists by name all of the Showlets that can be used with the ShowItem. Any of the listed Showlets, but only these Showlets, can be added to the ShowletMap for a particular role to use. The ShowletMap, World.Global.ShowletURLMap, and Showlets properties may each be an IPropertyMap.

When a given ShowItem object 96 is to be displayed, a URL for the user's role in the ShowRoom 92 (as given in the CurrentRoleMap property of the ShowRoom, the Showlet-Map property of the ShowItem, and the ShowletURLMap property of World.Global) is placed in the location given by the ShowletID DHTML idenitifier. Showlet identifiers are added to the page primarily by previous ShowItems, which are sometimes referred to as template ShowItems.

One identifier is predefined as "TopShowlet" and is the entire initial DHTML page. Showlet identifiers that replace the "TopShowlet" identifier are special in that they replace all Showlets on the display page. This means that previously displayed ShowItems are no longer relevant to the current display. A SubShowItemMap property lists the ShowItems that are currently being displayed within the ShowItem (such as a exercise element within a layout). This is based on the DHTML identifier indicating where the element is displayed, and the value is the ShowItem being displayed there. The SubShowItemMap property indicates the current state of the exercise.

User responses from a Showlet corresponding to a ShowItem object are communicated to the ShowItem via sub-exemplar-specific, server-side method calls. The Showlet calls a server-side method on the ShowItem. That method updates the state of the ShowItem appropriately, and then causes UpdateShowItem to be called on all client Showlets. The Showlet then updates its display to reflect the new state. This allows the ShowItem to decide what, if any, of the data communicated to it from the client should be redistributed to the other clients, either directly or in digested or collated form.

While ShowItem properties are being updated, a property UpdatingShowItem is set to true to prevent Showlets from accessing potentially inconsistent sets of properties. When UpdatingShowItem is set to false again, an OnUpdatingShowItemChanged method on the ShowItem object 96 calls an UpdateShowItem method on the corresponding Showlet. In another implementation a pair of method calls StartUpdate and EndUpdate are used rather than directly setting the UpdatingShowItem property. The Showlet then renders the updated ShowItem properties for the viewer.

A ResponseHistory property of ShowItem is an IPropertyList that includes all of the viewer responses to the ShowItem, with date/time stamps. For each response, there are several entries in the list. A first entry is the date/time stamp. A second entry is the name of the user that responded. A third entry is the name of the ShowItem method that was called to communicate the response. A fourth entry is a parameter count indicating how many parameters there are. Following these entries may be an arbitrary number of items that are used as parameters to the method call.

Participant Operation

When new users log onto the social dilemma exercise system, they are presented with a social dilemma exercise ShowRoom that represents one social dilemma exercise. The ShowRoom may be one of multiple ShowRooms representing varying social and interface factors and identified in a list taken from a World.Global.OpenShowRooms property, which as an IPropertyMap includes the room name as the key and the ShowRoom as the value. Each participant enters one of the listed exercises as assigned (e.g., randomly) by an administrator.

In one implementation, each user has one and only one role in a given ShowRoom. The role can be "participant" or "administrator" and may be listed according to the name for the user in the CurrentRoleMap property. If the name for a user is not found in the CurrentRoleMap property, the user is assigned a defaults role of "participant".

When a user enters a ShowRoom, the system activates or initiates a top level Showlet as directed by the CurrentTopShowItem property. This Showlet, in turn, activates sub-ShowItems according to the SubShowItemMap property. Activating a ShowItem involves finding a URL for a corresponding Showlet. The ShowletMap property translates from the user's role to a Showlet name. The World.Global.ShowletURLMap property translates from the Showlet name to a URL for the Showlet. The resulting URL is incorporated into a DHTML element indicated by the ShowletID property. As a result, a Showlet is created for each active ShowItem and the user is shown all the active ShowItems.

The Showlet updates its display to match the current state of the exercise for the corresponding ShowItem and response properties. However, the Showlet first checks the UpdatingShowItem property to confirm that those properties are consistent. If the are inconsistent, the Showlet is not updated, but an UpdateShowItem call soon be made to cause the appropriate update.

An administrator can add a new ShowItem to the ShowRoom or advance the exercise to the next ShowItem in the ShowElements list. The administrator can also edit a ShowItem and control it. Editing and control are specific to the ShowItem sub-exemplar being shown. When a new ShowItem is displayed, it will often displace one that previously had the same DHTML identifier.

When a user responds to a ShowItem, its Showlet calls a server-side method on the ShowItem that may digest the response and set a variety of properties. When done, UpdateShowItem methods on each of the client Showlets updates the display as seen by the users. The ShowItem also stores the response in the ResponseHistory property, together with the time and the name of the user. Sometimes, the digested responses are not immediately redistributed to the clients. Instead, they are stored until the administrator has the system distribute them.

Administrator Operation

A ShowRoom can be used to create a new exercise on-the-fly or the exercise can be prepared ahead of time by the administrator with a list of ready-made ShowItems. Exercises that are given multiple times can be created, and the ShowRoom for the exercise cloned each time a new instance of the exercise is needed. ShowRooms and ShowItems are cloned and edited to create and modify exercises. This cloning and editing can be performed beforehand or during the course of the exercise. Users that have a ShowRoomCreator property set to true get additional controls on the room selection page, allowing them to create a new room by cloning an existing room. The list of cloneable ShowRooms is stored in the World.Global.CloneableShowRooms propertymap, with the key being the room name and the value being the ShowRoom. A "blank" room exists in the list to create new exercises.

Once a new ShowRoom is created, any user with the role "administrator" can create new ShowItems within that room, allow different ShowItems to be rendered, or edit existing ShowItems. Changes by the administrator cause the Showlets to update as well. The room creator is automatically set as an administrator in the room, and any administrator can make other users administrators as well. ShowItems are created by cloning existing ShowItems in the same room. Each room has "blank" instances of each type of available ShowItem. This does not create excessive system overhead because there are relatively few ShowItem types, and unmodified versions are relatively small. Most of the information is contained in the exemplar. As a result, having blank copies of each type of ShowItem is not excessively expensive. As one alternative, a global prototype list that lists the exemplars that could be used to create new items. As another alternative, a wizard-based approach could be used.

ShowItems can be created in various stages of readiness, and then completed and cloned at preparation time or the time of the exercise. The default administrator view of the ShowItem allows the administrator to edit the text of the item, and to select the Showlet to be used for each role. Once a ShowRoom exercise is complete, the administrator can mark it as "open" can leave it unopen and clone it for each actual exercise to be given. ShowItems collect a complete history of the participant's responses, allowing later replay or analysis of the exercise.

In one implementation, each Showlet interface object 94 is in the form of a scriplet, which is a DHTML page that can be used as a control in any application that supports controls. Properties, methods, or events in the scriptlet are based upon scripts that may be written in common active scripting languages such as JavaScript, Visual Basic Scripting Edition (VBScript), or another language. The scripts rely on the scripting capabilities of DHTML, which gives a complete object model for elements on the scriptlet including use of the standard OBJECT tag that is used to insert and work with any other object on an html document. The use of and format of scriptlets is specified with Dynamic HTML in the Internet Client Software Development Kit (SDK) published by Microsoft Corporation.

Figure 10:
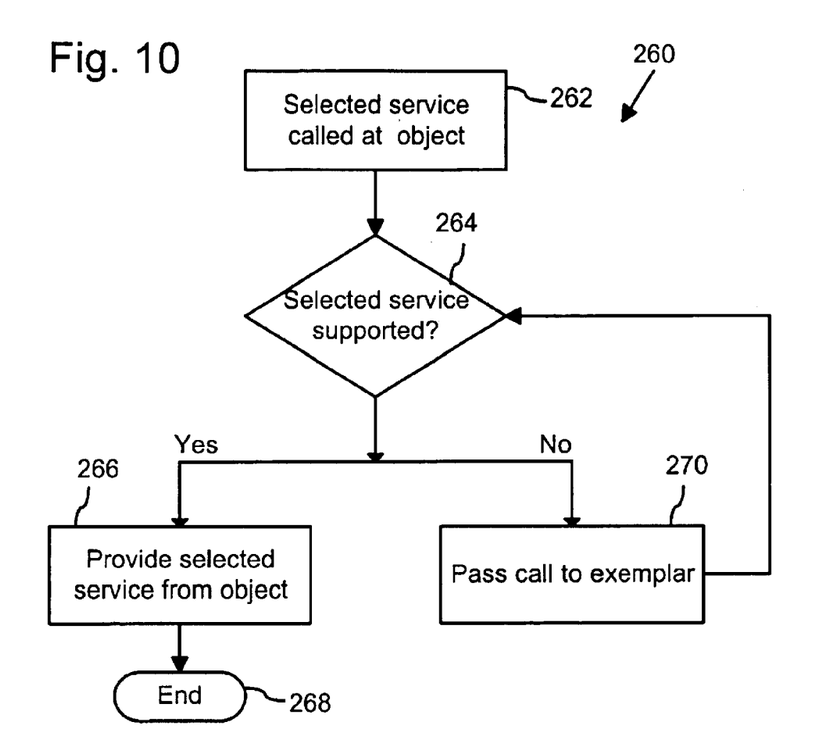
FIG. 10 is a flow diagram illustrating a hierarchical inheritance process.

FIG. 10 is a flow diagram illustrating a dynamic inheritance process 260 as a run-time use of objects. For purposes of illustration, dynamic inheritance process 260 is described with reference to the sequence of hierarchical inheritance relationships shown in FIG. 9.

Process block 262 indicates that a reference or call is made to a selected service (e.g., a property or a method) at a selected object (e.g., object 92), thereby making the selected object the current object. The reference or call may be made in the conventional manner that properties and methods of an object are referred to or called.

Query block 264 represents a query as to whether the current object receiving the reference or call (e.g., object 92) supports the selected property or method. Whenever the current object (e.g., object 92) supports the selected property or method, query block proceeds to process block 266. Otherwise, query block 264 proceeds to process block 270.

Process block 266 indicates that the selected property or method is provided by the current object. Process block 266 proceeds to termination block 268.

Process block 270 indicates that the reference or call to the selected property or method is passed to the direct exemplar of the current object (e.g., object 212) and the direct exemplar is redesignated the current object. Process block 270 returns to query block 264.

Process 260 provides a mechanism for dispatching properties and methods to exemplars. Process 260 supports dynamic inheritance of other properties and methods at run-time by allowing intervening exemplars to be added to a hierarchy of objects.

With reference to FIG. 8, in one implementation I-Thing interface 220 also defines, supports, or implements methods 220b that include the dynamic inheritance methods set forth in Table 1. Methods 220b in Table 1 are available to each object of which I-Thing interface 220 is the root exemplar (e.g., objects 210–216 and 92).

TABLE 1

| Name | Action |
| --- | --- |
| AddMethod | Adds a designated method to make the method available to the object |
| RemoveMethod | Removes a designated method to make the method unavailable to the object |
| AddProperty | Adds a designated property to make the property available from the object |
| RemoveProperty | Removes a designated property to make the property unavailable from the object |
| GetMethod | Returns a designated method including the number and types of the method parameters |
| GetProperty | Returns a designated method including the number and types of the property parameters |
| PutMethod | Puts a designated value or designated values in the parameters of a designated method |
| PutProperty | Puts a designated value or designated values in the parameters of a designated property |
| InvokeMethod | Invokes a designated method |

For example, methods and properties available for implementation or access by the dynamic inheritance methods of I-Thing interface 220 are in a dynamic inheritance listing, such as a table, that indicates the names of the methods and properties, defines the services they provide, and includes unique identifiers for them. The unique identifiers may be of the form of integer values like the dispatch identifiers (DISPIDs) used with the dispatch interface of the IDispatch interface used in COM automation.

The AddMethod and the AddProperty methods allow methods and properties, respectively, to be added to the dynamic inheritance listing so that the listing may be modified during run-time. These methods pass the name and a definition of the method or property to be added to the dynamic inheritance table and assign a corresponding unique identifier for the method or property. The RemoveMethod and the RemoveProperty methods remove methods and properties from the dynamic inheritance listing. The InvokeMethod method allows a user to execute the designated method. The GetMethod and the GetProperty methods return the designated method and property, respectively, from the dynamic inheritance listing. The PutMethod and the PutProperty methods allow a user to set the method or property.

The dynamic inheritance methods of Table 1, as well as the dynamic inheritance process 260 of FIG. 10, allow methods and properties to be dynamically added to or changed within otherwise conventional static interfaces. The adding of the methods and properties includes accessing information about the methods and properties, setting values in and retrieving values from them, and invoking the methods. Methods and properties may be added in effect by accessing them from an exemplar to a particular interface or object according to dynamic inheritance process 260. In addition, methods and properties may be added by adding them to the set of methods and properties available at an exemplar, such as the root exemplar I-Thing.

These features allow inheritance to be dynamic and provide a seamless scripting environment in programmable applications like virtual world environments. Moreover, the dynamic inheritance methods of Table 1 and dynamic inheritance process 260 of FIG. 10 may be used together as described hereinabove, or either may be used alone to provide dynamic inheritance functionality.

The dynamic inheritance method InvokeMethod is similar to the Invoke method of the IDispatch interface used in COM automation. The IDispatch::Invoke method allows a software client to invoke a designated software method available from another application. The methods available from the other application are specified in a dispatch interface (often called a dispinterface). Dispatch identifiers (DISPIDs) identify the available methods. The similarity between the dynamic inheritance of this invention and the IDispatch interface used in COM automation extends no farther.

The dynamic inheritance of this invention allows methods and properties to be added to or removed from the set of available methods and properties. In contrast, IDispatch interface used in COM automation is a conventional COM interface and is immutable once it has been established. Methods and properties are not added to an IDispatch interface after it has been established. It will be appreciated, therefore, that changing the methods and properties available to an interface like the I-Thing interface 220 after it has been established is a major improvement upon the prior functionality of objects with fixed interfaces (e.g., COM objects) like the IDispatch interface.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a computer-readable medium, software objects of a social dilemma virtual world environment for evaluating an interactive online society of plural participants, the software objects comprising:

one or more social dilemma exercise objects that, when executed on a computer, implement a social dilemma exercise between the participants and logs social factors and interface factors that can be evaluated to determine a level of success of the social dilemma exercise; and one or more computer-based communication objects that, when executed on a computer, selectively provide computer-based communication between participants in the social dilemma exercise.

2. The software objects of claim 1 in which the one or more social dilemma exercise objects are distributed between computer readable media associated with a server computer and computer readable media associated with a plurality of client computers operated by corresponding ones of the participants.

3. The software objects of claim 2 further comprising user interface objects at the client computers in communication with the one or more social dilemma exercise objects to provide corresponding user interfaces at the client computers.

4. The software objects of claim 2, wherein the user interface object enable a different user interface to be provided for each client computer.

5. The software objects of claim 1 in which the one or more computer-based communication objects are configured to selectively provide synchronous text chat computer-based communication between the participants.

6. The software objects of claim 1, the one or more computer-based communication objects further configured to monitor and log social dilemma exercise interactions between the participants.

7. The software objects of claim 6 in which the social dilemma exercise interactions further comprise social factors and interface factors.

8. A method of evaluating online interactive communications, comprising:

selecting a first set of social factors and interface factors in a distributed social dilemma exercise;

selecting a second set of social factors and interface factors in the social distributed social dilemma exercise, at least one of the factors in the first and second sets being different;

conducting for plural participants at east one social dilemma exercise utilizing the first and second set of factors; and logging results of the social dilemma exercise so that the effect of the existence of the different factors can be evaluated.

9. The method of claim 8 wherein the social factors include at least one of the following social factors: synchronous text chat; asynchronous text chat; verbal communication; audio communication; video communication; historical information; social information; background information.

10. The method of claim 8 wherein the interface factors further comprise format, style and/or layout of a computer-based interactive environment.

11. The method of claim 8 wherein the logged results can be evaluated to determine the effects of the social factors and the interface factors on a degree of online cooperation between the participants.

12. The method of claim 8 further comprising altering at least one social or interface factor in either the first set of factors or the second set of factors and logging subsequent results of the social dilemma exercise so that the effect of the alteration can be evaluated.

13. The method of claim 8 in which the social factors and the interface factors are related to client computers representing the participants, wherein the social dilemma exercise is initiated from a server computer that communicates with the client computers.

14. An online interactive communications evaluation system, comprising:

one or more social factor objects stored on one or more computer-readable media that, when executed, provide social factors of an online social dilemma exercise to multiple participants;

one or more interface factor objects stored on one or more computer-readable media that, when executed, provide interface factors of the online social dilemma exercise to multiple participants;

means for providing communication between the online participants;

means for monitoring inter-participant communications; and an evaluation object configured to correlate results of the social dilemma exercise with the inter-participant communication.

15. The system of claim 14 in which the social factor objects comprise the means for providing the communication between the participants.

16. The system of claim 15 in which the social factor objects selectively provide the inter-participant communication between the participants.

17. The system of claim 14 in which the interface factor objects are further configured to provide control over a layout and style in which the social dilemma exercise is presented to the participants.

18. The system of claim 17 in which the interface factor objects are configurable to provide different presentations of the social dilemma exercise to the participants.

19. The system of claim 14 in which the social factor objects and interface factor objects are distributed between computer readable media associated with a server computer and computer readable media associated with plural client computers operated by corresponding ones of the participants.

20. The system of claim 19 further comprising user interface objects at the client computers in communication with the social factor objects and interface factor objects to provide corresponding outputs at the client computers.

* * * * *